United States Patent
Sandstrom

(10) Patent No.: US 7,595,360 B2
(45) Date of Patent: Sep. 29, 2009

(54) RUBBER COMPOSITION CONTAINING DIENE-BASED ELASTOMER, PRECIPITATED SILICA, COUPLING AGENT AND ALCOHOL-ADSORBING ACTIVATED CARBON AND PNEUMATIC TIRE WITH COMPONENT

(75) Inventor: Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 289 days.

(21) Appl. No.: 11/606,674

(22) Filed: Nov. 30, 2006

(65) Prior Publication Data

US 2008/0128064 A1 Jun. 5, 2008

(51) Int. Cl.
*C08K 3/34* (2006.01)
*B60C 1/00* (2006.01)

(52) U.S. Cl. .................... 524/493; 524/492

(58) Field of Classification Search ............ 524/493, 524/492
See application file for complete search history.

(56) References Cited

U.S. PATENT DOCUMENTS

| | | | | |
|---|---|---|---|---|
| 2,083,303 | A | 6/1937 | Krczil | 252/3 |
| 2,508,474 | A | 5/1950 | Slyh et al. | 252/422 |
| 3,420,913 | A | 1/1969 | Railsback | 260/763 |
| 4,278,587 | A | 7/1981 | Wolff et al. | 260/42.37 |
| 5,206,207 | A | 4/1993 | Tolles | 502/424 |
| 5,212,144 | A | 5/1993 | Schwartz, Jr. | 502/423 |
| 5,250,491 | A | 10/1993 | Yan | 502/424 |
| 5,696,197 | A | 12/1997 | Smith et al. | 524/495 |
| 6,046,266 | A * | 4/2000 | Sandstrom et al. | 524/492 |
| 6,337,302 | B1 | 1/2002 | Teng et al. | 502/432 |
| 6,479,571 | B1 * | 11/2002 | Cooke et al. | 523/215 |
| 6,573,324 | B1 | 6/2003 | Cohen et al. | 524/492 |
| 6,696,384 | B2 | 2/2004 | McCrae et al. | 502/180 |
| 6,863,713 | B1 | 3/2005 | Ghosal et al. | 95/117 |
| 2005/0009955 | A1 | 1/2005 | Cohen | 523/212 |
| 2006/0247360 | A1 * | 11/2006 | Halasa et al. | 524/493 |

FOREIGN PATENT DOCUMENTS

EP 1690894 A1 8/2006

OTHER PUBLICATIONS

Albert Yehaskel, "Activated Carbon Manufacture and Regeneration", Park Ridge, N. J., Noyes Data Corp., 1978, pp. 3-4, 51, 119-120, 135-136.*
Roop Chand Bansal, "Activated Carbon Adsorption", Boca Raton, London, Taylor & Francis, 2005, pp. 2 and 5.*
European Search Report completed Feb. 18, 2008.

* cited by examiner

*Primary Examiner*—Ling-Siu Choi
*Assistant Examiner*—Hui Chin
(74) *Attorney, Agent, or Firm*—Henry C. Young, Jr.

(57) ABSTRACT

The present invention relates to a rubber composition comprised of diene based elastomer, precipitated silica, particulate low molecular weight alcohol-adsorbing (e.g. alkanol-adsorbing) activated carbon and coupling agent comprised of at least one of organopolyalkoxysilane polysulfide (e.g organopolyalkoxysilyl polysulfide such as a bis(3-trialkoxysilylalkyl polysulfide) and organoalkoxymercaptosilane. The invention further relates to a tire having a component of such rubber composition.

2 Claims, No Drawings

US 7,595,360 B2

RUBBER COMPOSITION CONTAINING DIENE-BASED ELASTOMER, PRECIPITATED SILICA, COUPLING AGENT AND ALCOHOL-ADSORBING ACTIVATED CARBON AND PNEUMATIC TIRE WITH COMPONENT

FIELD OF THE INVENTION

The present invention relates to a rubber composition comprised of diene based elastomer, precipitated silica, particulate low molecular weight alcohol-adsorbing (e.g. alkanol-adsorbing) activated carbon and coupling agent comprised of at least one of organopolyalkoxysilane polysulfide (e.g. organopolyalkoxysilyl polysulfide such as a bis(3-trialkoxysilylalkyl polysulfide) and organoalkoxymercaptosilane. The invention further relates to a tire having a component of such rubber composition.

BACKGROUND OF THE INVENTION

Various pneumatic tires have been proposed of which at least one component thereof is a rubber composition containing at least one diene-based elastomer, synthetic amorphous silica reinforcement, for example a particulate precipitated silica, for which the silica is coupled to the elastomer by an organopolyalkoxysilane polysulfide or organomercaptoalkoxysilane coupling agent. In general, the alkoxy group moieties of the coupling agent react with hydroxyl groups (e.g. silanol groups) contained on the silica (e.g. precipitated silica), and wherein sulfur atoms from the polysulfide or mercapto moiety interact with the diene-based elastomer(s), to create the coupling effect, a phenomenon well known to those skilled in such art.

Exemplary of such organopolyalkoxysilyl polysulfide coupling agents are, for example, bis(3-trialkoxysilylalkyl) polysulfides which contain an average of from 2 to about 4, alternately an average of from 2 to about 2.6, connecting sulfur atoms in their polysulfidic bridge. At least one of such alkoxy groups may be comprised of a low molecular weight alkoxy group containing from 2 through 4 carbon atoms such as for example, an ethyl, propyl and/an or butyl groups as, for example, an ethoxy, propoxy or butoxy group or their mixtures. The remainder of such alkoxy groups, if any, for such trialkoxy moiety of the coupling agent may be of a higher molecular weight which may contain, for example, from 5 through 18 carbon atoms.

Representative of such coupling agent is, for example, comprised of a bis(3-triethoxysilylpropyl)polysulfide.

Use of such coupling agent is proposed in numerous patent publications, a partial representative example of which are, which is intended to be exemplary and not intended to be inclusive, U.S. Pat. Nos. 4,278,587, 5,696,197 and 6,046,266.

It is well known that the reaction of such alkoxy moiety-containing coupling agent, where its alkoxy groups contain at least one low molecular weight alkoxy group such as for example an ethoxy group in which at least one of the alkoxy substituents is an ethanol radical, reacts with reactive substituents such as for example hydroxyl groups (e.g. silanol groups) contained on the silica (e.g. precipitated silica) wherein a volatile low molecular weight alkyl hydrocarbon alcohol (alkanol) by-product is formed having, for example, from 2 to and including 4 carbon atoms, such as for example ethanol, by the reaction between the aforesaid alkoxy group(s) and hydroxyl group(s).

Historically, elimination, or substantial elimination, of a volatile alcohol (alkanol) by-product within a rubber composition such as, for example, caused by the reaction of an organopolyalkoxysilane polysulfide, or an organoalkoxymercaptosilane, with hydroxyl groups on a precipitated silica in situ within the rubber composition was a proposed pre-treatment of the precipitated silica prior to its addition to the rubber composition. By such method, the alcohol (e.g. ethanol) by-product was produced outside the rubber composition so that the addition of the pre-treated silica to the rubber composition yielded little, if any, of the alcohol by-product in situ within the rubber composition. For example, see U.S. Pat. No. 6,573,324 and U.S. Patent Application No. 2005/0009955.

However, such silica pretreatment involves an additional and separate preparation step(s) for the processing of the silica, coupling agent and rubber composition.

Accordingly, it is desired herein to provide a simpler methodology for preparation of a rubber composition which does not require such additional, separate, preparation step of pre-treating the silica, to inhibit, or retard, the presence of alcohol by-product formed in situ within the rubber composition.

An important aspect of this invention is an inclusion of a dispersion of an alcohol-adsorbing, particularly a low molecular weight alcohol-adsorbing (e.g. ethanol-adsorbing) particulate activated carbon in the diene-based elastomer containing rubber composition to at least partially adsorb the low molecular weight, and relatively volatile, alcohol by-product (e.g. alkanol comprised of ethanol) and to thereby inhibit or retard its evolution into the tire and/or atmosphere.

Activated carbon, in general, can be a very versatile adsorbent for various gases and liquids in a sense that the size and density of its pores can be considerably varied.

Activated carbon can be, for example, a primarily amorphous particulate form of carbon, usually a microcrystalline, non-graphitic form of carbon, having a large surface area and pore volume which can make it useful in providing adsorptive properties for adsorbing various gases and liquids. For example, its average specific surface area (BET nitrogen adsorption) may be in a range of, for example, from about 500 to about 2000 $m^2/g$ or even greater. Such surface area is of a significant magnitude greater than the average nitrogen adsorption (BET) surface area in a range of, for example, from about 8 to about 150 $m^2/g$ for typical rubber reinforcing carbon blacks and therefore considered herein as being exclusive of such rubber reinforcing carbon blacks.

Commercial grades of activated carbon are often referred to as being gas-phase and liquid-phase adsorbents although the adsorbent abilities may somewhat overlap each other depending upon a particular activated carbon and intended gas and/or liquid to be adsorbed.

Generally, the larger the surface area of the activated carbon, the greater its adsorption capacity with the available surface area of the activated carbon being somewhat dependent upon its pore volume.

Therefore a large surface area may be promoted, for example, by:

(A) maximizing the number of pores of very small dimensions and/or (B) minimizing the number of pores of very large dimensions.

The pores are often referred to in the sense of their sizes by the International Union of Pure and Applied Chemistry as "micropores", "mesopores" and "macropores".

Micropores are referred to as having a pore width of less than 1.8 nm, mesopores having a pore width of from 1.8 to 50 nm and macropores having a pore width of greater than 50 nm. It is the presence and pore size distribution of the micropores and mesopores which are considered to contribute to the adsorptive capacity of the activated carbon. For example, a relatively high pore volume percentage of mesopores (e.g. above 50 percent of the total pore volume) is generally desirable.

Various raw materials may be used as a source for the carbon by carbonizing and then activation such as, for example and not intended to be limited, wood chips, sawdust, lignite, coconut shells, coal and carbon black refuse, to name a few sources.

Various methods of preparing activated carbon may be used. For example activated carbon may be prepared by one of two distinct processes, namely, by (A) chemical activation, or
(B) thermal activation.

For example, thermal activation typically involves gasification of the carbon at relatively high temperatures, after an initial carbonization of the raw material. For example, chemical activation typically involves chemical dehydration/condensation reactions at significantly lower temperatures. For example, a carbonaceous material such as a lignocellulosic material may be treated with a chemical activation agent such as, for example, phosphoric acid or zinc chloride. Such lignocellulosic material may be, for example, wood chips and/or sawdust. Various method of preparing activated carbon are well known by those having skill in such art.

Various functional groups may be also formed, if desired, during activation of the carbon, for example by interaction of free radicals on the carbon surface, to render the surface of the activated carbon chemically reactive and to thereby further influence its adsorptive abilities and properties.

Activated carbon has been commercially manufactured and marketed for many years as adsorbents for various gasses and liquids (including for, example, use in gas masks and automobile gasoline recovery canisters as well as many other uses) and therefore are well known, as well as various methods of preparation, by those having skill in such art.

Representative examples of various activated carbon as well as applications and methods of preparation may be found, for example, in U.S. Pat. Nos. 5,206,207, 5,212,144, 5,250,491, 6,337,302, 6,863,713 and 6,696,384 (using carboxy methylcellulose post treatment) as well as earlier U.S. Pat. Nos. 2,083,303 and 2,508,474.

Representative of various commercially available activated carbons for various purposes are, for example, activated carbon from the MeadWestvaco company such as, for example, WV-A900, WV-A1100, WV-A1500, BAX950, BAX1100 and BAX1500; activated carbon from the Carbochem company such as, for example CARBOCHEM™ GS-75, GL80, VP-50, LP-30, DC-50, DC-40, LQ-900, LQ-1000, LQ900S, LQ-1240 and CA-10; activated carbon and activated carbon families from the Calgon Carbon Corporation as, for example, Ventsorb™, Vapor Pac™, Cal™, Cane Cal™, CPG™, Filtrasorb™, GW™, MRX™, and WPL-WPH™.

For this invention, it is desired that the activated carbon has an ability (e.g. a suitable combination of surface area and pore size distribution) for adsorbing a low molecular weight alcohol (alkanol) such as for example ethanol, the preparation and use of which is considered herein to be within the ability of a person skilled in the art of activated carbon preparation without undue experimentation.

In practice, it is considered herein that the use of a dispersion of an ethanol-adsorbing activated carbon (e.g. low molecular weight alkanol-adsorbing activated carbon) in a rubber composition containing at least one diene-based elastomer, precipitated silica and organopolyalkoxysilane polysulfide or organoalkoxymercaptosilane, such as, for example, a bis(3-alkoxysilylalkyl)polysulfide for the organopolyalkoxysilane, where at least one of the alkoxy substituents is an ethyl radical in which an ethanol by-product is formed, to thereby adsorb said ethanol by-product is novel and a significant departure from past practice, particularly for a tire component of such rubber composition.

While the mechanism may not be fully understood, an important aspect of the invention is for the inclusion of the dispersion of particulate low molecular weight alcohol (e.g. ethanol) adsorbing activated carbon filler which can adsorb such alcohol (alkanol) and thereby retard or substantially inhibit such alcohol by-product from atmospheric evolution.

In the description of this invention, the term "phr" is used to designate parts by weight of an ingredient per 100 parts of elastomer, including the butyl rubber, unless otherwise indicated. The terms "elastomer" and "rubber" are used interchangeably unless otherwise indicated. The terms "cure" and "vulcanize" are used interchangeably unless otherwise indicated.

SUMMARY AND PRACTICE OF THE INVENTION

In accordance with this invention a rubber composition is provided which is comprised of a diene-based elastomer, synthetic amorphous silica (e.g. precipitated silica) reinforcement containing hydroxyl groups (e.g. silanol groups), a coupling agent comprised of at least one of organopolyalkoxysilane polysulfide and organoalkoxymercaptosilane, wherein at least one of said alkoxy groups (radicals) of said coupling agent is an alkoxy group selected from ethoxy, propoxy and butoxy groups, preferably comprised of an ethoxy group, and a dispersion of a particulate alcohol-adsorbing, preferably a low molecular weight alcohol-adsorbing (e.g. low molecular weight alkanol comprised of ethanol-adsorbing) activated carbon.

Exemplary of said organopolyalkoxysilane polysulfide coupling agent is comprised of a bis(3-trialkoxysilylalkyl) polysulfide having an average of from 2 to 4, alternately an average of from 2 to about 2.6, and alternately an average of from about 3.4 to about 3.8, connecting sulfur atoms in its polysulfidic bridge wherein at least one of its alkoxy groups is an ethoxy group.

In further accordance with this invention, a method is provided which comprises the sequential steps of:

(A) blending a particulate alcohol-adsorbing, preferably low molecular weight alcohol-adsorbing (e.g. low molecular weight alkanol adsorbing such as ethanol adsorbing) activated carbon with a rubber composition comprised of at least one conjugated diene-based elastomer and precipitated silica filler which contains hydroxyl groups (e.g. silanol groups) on its surface, (B) blending a silica coupling agent therewith comprised of (1) bis(3-trialkoxysilylalkyl)polysulfide having a average of from 2 to about 4, alternately an average of from 2 to about 2.6, connecting sulfur atoms in its polysulfidic bridge, wherein at least one of said alkoxy groups of said coupling agent is an ethoxy group, or (2) organoalkoxymercaptosilane wherein at least one of said alkoxy groups is comprised of at least one of ethoxy, propoxy and butoxy groups, and (C) allowing the alkoxy groups of said coupling agent to react with hydroxyl groups on said precipitated silica to form an alcohol by-product (e.g. alkanol by-product comprised of ethanol);

wherein said alcohol-adsorbing (e.g. low molecular weight alkanol comprised of ethanol-adsorbing) carbon absorbs at least a portion of said alcohol (e.g. alkanol comprised of ethanol) by-product.

In additional accordance with this invention, a pneumatic tire is provided having a component of a rubber composition comprised of at least one conjugated diene-based elastomer, precipitated silica and coupling agent comprised of said bis (3-trialkoxysilylalkyl)polysulfide or said organoalkoxymercapto silane, wherein said rubber composition contains a dispersion of a particulate alcohol-adsorbing, preferably low molecular weight volatile alcohol (e.g. alkanol comprised of ethanol) adsorbing activated carbon.

In further accordance with this invention a process of providing a pneumatic rubber tire having a component (e.g. tread) of a rubber composition which contains precipitated silica reinforcement together with a coupling agent comprises:

(A) building a tire having a component of a rubber composition of a rubber comprised of at least one conjugated diene based rubber composition which contains a precipitated silica having hydroxyl groups (e.g. silanol groups) on its surface and a coupling agent comprised of a bis(3-trialkoxysilylalkyl)polysulfide having an average of from 2 to about 4, alternately an average of from 2 to about 2.6, connecting sulfur atoms in its polysulfidic bridge, wherein at least one of said alkoxy groups of said coupling agent is an ethoxy group, or an organoalkoxymercaptosilane wherein the alkoxy group thereof is comprised of an ethoxy group, and (B) allowing the alkoxy group(s) of said coupling agent to react with hydroxyl groups on said precipitated silica to form an alcohol by-product (e.g. alkanol comprised of ethanol);

wherein said rubber composition contains a dispersion of a low molecular weight alcohol-adsorbing (e.g. ethanol adsorbing) activated carbon filler.

In one embodiment, said particulate alcohol-adsorbing activated carbon adsorbs at least a portion of said alcohol (alkanol) by-product (e.g. ethanol by-product) formed within said rubber composition.

In practice, the rubber composition may also contain an alkoxysilane (of which its alkoxy group is comprised of a methoxy or ethoxy group) for further hydrophobating the precipitated silica in which the alkoxy group of the alkoxysilane reacts with an hydroxyl group (e.g. silanol group) of the precipitated silica in which an alkanol by-product (e.g. ethanol or methanol) is formed for which an included low molecular weight alkanol-adsorbing activated carbon adsorbs at least a portion of said alkanol by-product in situ within the rubber composition. Such alkoxysilane may be of the general formula (I):

$(RO)_3—Si—R_1$      (I)

where R is selected from methyl and ethyl radicals, preferably ethyl radicals, and $R^1$ is a saturated alkyl radical having from 2 through 6 carbon atoms.

Representative of said alkoxysilanes are, for example, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

For this invention, said inclusion of said dispersion of low molecular weight alcohol-adsorbing activated carbon is intended to at least partially adsorb said low molecular weight alcohol (e.g. ethanol) by-product in situ within the rubber composition.

For this invention, various synthetic amorphous silicas may be used in a form of a precipitated silica representative of which are, for example and not intended herein to be limiting, HiSil™ 210, 233, 243 and 532 from PPG Industries, Micropearl™ from Rhodia, Hubersil 4155™ from the J. M. Huber Company and Ultrasil™ VN2 and VN3 from the Degussa Company.

The following Examples are provided to further illustrate the invention where the parts and percentages are by weight unless otherwise indicated.

EXAMPLE I

A prospective exemplary illustrative silica reinforced rubber composition containing a coupling agent together with a particulate ethanol-adsorbing activated carbon can be prepared by mixing ingredients in an internal rubber mixer. The ingredients can be mixed in at least one sequential, non-productive, mixing stage followed by a productive mixing stage in which sulfur curative(s) are added. The proposed ingredients are illustrated in the following Table 1. The parts and percentages are by weight unless otherwise indicated.

TABLE 1

|  | Parts |
|---|---|
| Non Productive Mixing Step |  |
| Cis 1,4-polybutadiene rubber[1] | 30 |
| S-SBR[2] | 70 |
| N234 Carbon black[3] | 10 |
| Processing oils and microcrystalline wax | 25 |
| Precipitated silica[4] | 50 |
| Coupling agent[5] | 8 |
| Zinc oxide | 3 |
| Antidegradents[6] | 2 |
| Particulate ethanol-adsorbing activated carbon | 5 |
| Productive Mixing Step |  |
| Sulfur | 2 |
| Sulfur vulcanization accelerators[7] | 3 |

[1]Cis 1,4-polybutadiene rubber as BUD 1207 ™ from The Goodyear Tire and Rubber Company
[2]Solution polymerization prepared styrene/butadiene rubber
[3]N234 a rubber reinforcing carbon black (an ASTM designation)
[4]Precipitated silica as HiSil 210 ™ from PPG Industries which contains hydroxyl groups (e.g. silanol groups).
[5]Coupling agent as Si69 from Degussa as a composite (50/50 weight ratio) of carbon black and a bis(3-triethoxysilylpropyl) polysulfide having an average of from about 3.4 to about 3.8 connecting sulfur atoms in its polysulfidic bridge and reported in the Table in terms of the composite.
[6]Of the amine and quinoline types
[7]Sulfenamide and diphenyl guanidine types Upon mixing the rubber composition, ethanol will be evolved as a by-product from the reaction of the ethoxy groups of the coupling agent with hydroxyl groups contained on the precipitated silica. The ethanol-adsorbing activated carbon is to adsorb at least a portion of the ethanol by-product to inhibit its atmospheric evolution from the rubber composition.

Following the mixing steps, the rubber composition is extruded at an elevated temperature to form a tread strip which is used in the following Example II. During the extrusion process, further hydrophobation of silica takes place (reaction of alkoxy groups of the coupling agent with hydroxyl groups on the silica) with an accompanying evolution of ethanol which can be adsorbed by the ethanol-adsorbing activated carbon.

EXAMPLE II

A prospective exemplary illustrative tubeless pneumatic rubber tire can be prepared with the extruded tread strip of the rubber composition of Example I.

The green (uncured) tire can be cured in a suitable tire curing mold at a temperature, for example, of up to about 150° C. for a period of, for example, about 18 minutes to form the vulcanized tire.

It is considered herein that the inclusion of the particulate ethanol-adsorbing activated carbon will adsorb at least a portion of the aforesaid ethanol by-product produced by a further reaction of alkoxy groups of the coupling agent with hydroxyl groups on the silica in the rubber composition of the tread strip during the curing of the green tire containing the prepared tread strip to therefore inhibit evolution of the ethanol by-product from the cured tire.

While certain representative embodiments and details have been shown for the purpose of illustrating the invention, it will be apparent to those skilled in this art that various changes and modifications may be made therein without departing from the spirit or scope of the invention.

What is claimed is:

1. A rubber composition comprised of a diene-based elastomer, precipitated silica reinforcement containing hydroxyl groups, coupling agent comprised of at least one of bis(3-trialkoxysilylalkyl) polysulfide having an average of from 2 to 4 connecting sulfur atoms in its polysulfidic bridge and organoalkoxymercaptosilane, wherein at least one of said alkoxy groups of said coupling agent is an ethoxy group, and a dispersion of a particulate ethanol-absorbing activated carbon which contains absorbed ethanol byproduct from the reaction of said ethoxy group with said hydroxyl groups of said precipitated silica reinforcement.

2. A pneumatic tire having a component comprised of the rubber composition of claim 1.

* * * * *